Patented May 25, 1926.

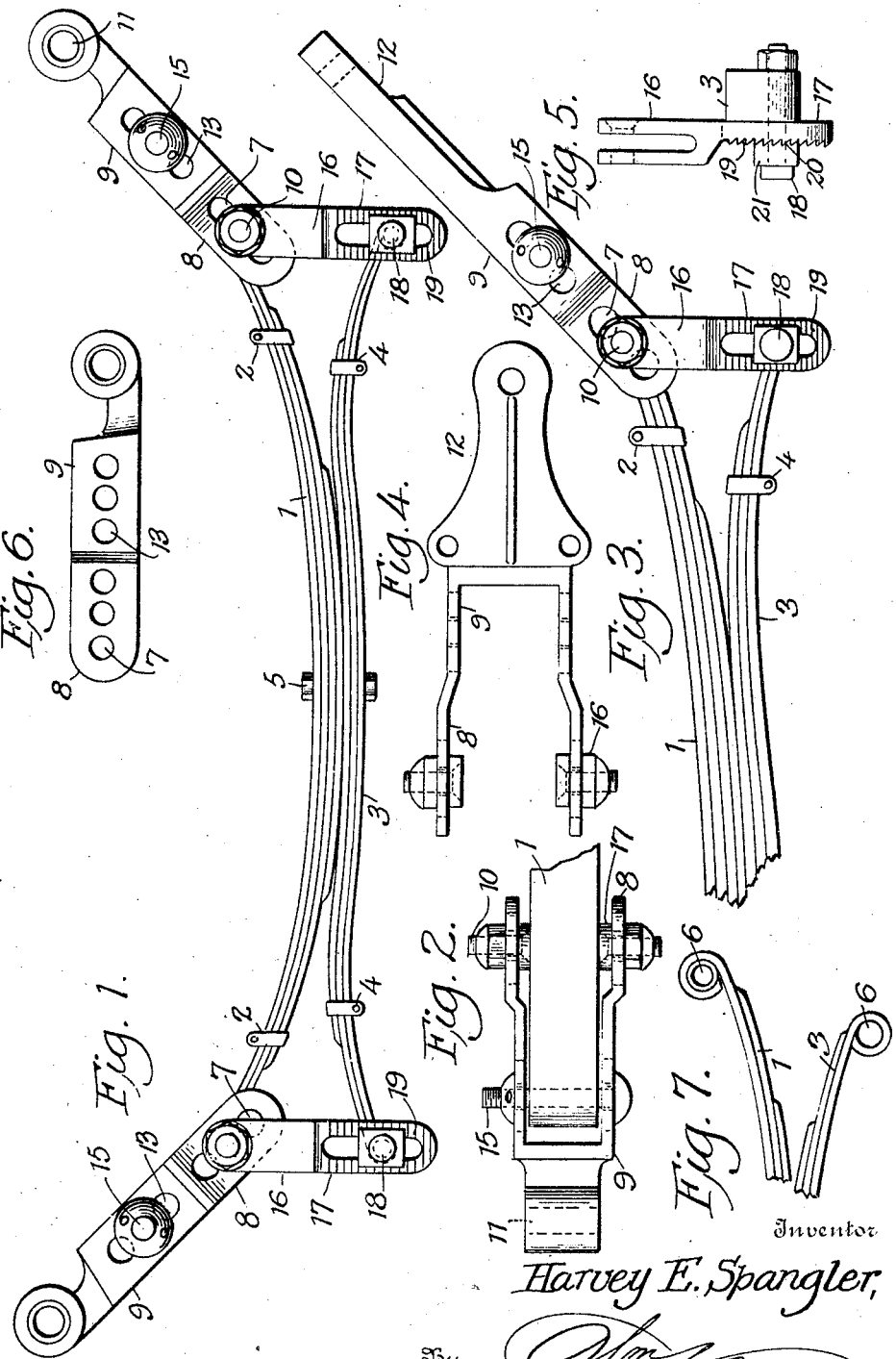

1,586,389

UNITED STATES PATENT OFFICE.

HARVEY E. SPANGLER, OF INDIANAPOLIS, INDIANA.

VEHICLE SPRING.

Application filed June 21, 1923. Serial No. 646,837.

My invention relates to improvements in vehicle springs, which while capable of use in any situation where they would perform their functions, are particularly adapted for use on motor vehicles or automobiles.

One object of my invention is the provision of a vehicle spring which will perform the service of a spring and shock absorber to insure an easy and comfortable riding and support for the body of the vehicle.

Another object of my invention is the provision of a vehicle spring having shock absorbing qualities and which will be capable of various adjustments to suit the conditions under which it is used.

Another object of the invention is the production of a spring of the character and for the purposes stated, which will be of simple, strong and durable construction while of the right weight; which will be of small and compact size and easy of adjustment and which can be sold at the proper price, all to insure the production of a practical, desirable and efficient vehicle spring.

To attain the desired objects my invention consists of a vehicle spring embodying novel features of construction and combination of parts for service, substantially as described and defined by the claim, and as shown in the accompanying drawing, in which:—

Figure 1 represents a side elevation of a vehicle spring constructed in accordance with and embodying my invention.

Figure 2 represents a top plan view of one of the end hangers or supporting brackets.

Figure 3 represents a side elevation of an end portion of my device shown on an enlarged scale and having a modified form of hanger or bracket.

Figure 4 represents a top plan view of the form of end hanger or bracket shown in Figure 3.

Figure 5 represents an edge view of one of the adjustable links for connecting the ends of the spring members.

Figure 6 represents a side view of one of the end hangers or supporting brackets, and Figure 7 is a detail view showing the end of the spring members to show details thereof.

Referring by numeral to the drawing, in which the same numbers of reference are used to denote the same parts in all the views:

The numeral 1 designates the main or upper spring member composed of a series of leaves secured in proper relation by the clips 2, and 3 designates the auxiliary or lower spring member, composed of a series of leaves secured by the clips 4, both the lower and upper members being secured together in opposite relation by the central fastening 5, and said upper and lower spring members having a bolt receiving eye 6, at each end.

From this construction it will be noted that my device is composed of two oppositely arranged and connected spring members composed each of a series of leaves of the desired width and length, and to each end of the upper spring member is connected through the medium of either of the bolt openings 7, of the yoke 8, of the end hangers or brackets 9, the fastening bolts 10, which thus support the spring as a whole through the medium of the eyes 11, or the plates 12, the entire structure from the vehicle in connection with which the spring is used.

The said hangers or brackets are further provided with an upper series of openings 13, whose purpose is to receive the bolts 15, for supporting the upper spring member at a higher level than when supported from the openings 7, thus permitting a vertical adjustment of the spring to suit the convenience and service required, the series of openings 7 and 13, allowing various adjustments as will be evident. The purpose of the bolts 15 is to permit adjustment in the series of openings 13, said bolts permitting the use of springs 1 of different lengths as circumstances require.

The lower fastening bolts 10, also pass through the bifurcated portion or vertical fork 16, of the links 17, which are connected by the bolts 18, with the end eyes 6 of the lower spring member 3, thus connecting the ends of the upper and lower spring member, and the lower outer faces of said links are formed with teeth 19, which co-act with the teeth 20, on the nuts 21, which thus serve to clamp the lower spring member in the desired vertical adjustment with reference to the upper spring member.

From the foregoing description taken in connection with the drawing the operation and many advantages of my vehicle spring will be readily understood and appreciated, and it will be apparent that my spring provides a practical shock absorber; that the construction insures simplicity, durability and cheapness of production; that the spring may be adjusted with ease and facility to suit the vehicle upon which it is used; and that its general usefulness and efficiency will commend it as highly practical and desirable as a shock absorbing vehicle spring.

I claim:

The spring device herein described consisting of the upper and lower oppositely disposed connected springs, a pair of hangers having each an upper loop for connection with the vehicle and a series of openings for adjustable connection with the ends of the upper spring member, a pair of links having a bifurcated upper end to straddle the lower end of said hangers and having an opening to register with one of the series of openings in said hangers, connecting bolts passing through said openings, a slotted opening in the lower end of said links, teeth contiguous with said slots, bolts passing through said slots and the ends of said lower spring members and nuts having teeth to engage the teeth on the links to retain the spring members in proper adjusted relation.

In testimony whereof I hereunto affix my signature.

HARVEY E. SPANGLER.